United States Patent [19]

Weyls et al.

[11] Patent Number: 5,006,262

[45] Date of Patent: Apr. 9, 1991

[54] PROCESS FOR RECOVERING COPPER FROM COPPER ION CONTAINING AQUEOUS SOLUTIONS

[75] Inventors: John Weyls, Cleveland, Ohio; Ray C. Lindemann, Montgomery, Ala.

[73] Assignee: Met. Rev. Inc., Cleveland, Ohio

[21] Appl. No.: 440,126

[22] Filed: Nov. 21, 1989

[51] Int. Cl.$^5$ ................................ C02F 1/70
[52] U.S. Cl. .................... 210/719; 75/721; 75/740; 204/DIG. 13; 210/737; 210/757; 210/912
[58] Field of Search .............. 75/718, 721, 740; 204/DIG. 13; 210/719, 737, 757, 766, 912; 423/34

[56] References Cited

U.S. PATENT DOCUMENTS

| | | | |
|---|---|---|---|
| 2,645,635 | 7/1953 | Walton | 423/34 |
| 2,831,763 | 4/1958 | Nashner et al. | 75/718 |
| 3,438,767 | 4/1969 | Busch | 75/718 |
| 3,505,217 | 4/1970 | Morico | 210/757 |
| 3,666,447 | 5/1972 | Saubestre | 75/721 |
| 3,673,086 | 6/1972 | Drobnik | 210/757 |
| 3,701,650 | 10/1972 | van der Zeeuw | 75/718 |
| 3,770,630 | 11/1973 | Kamperman | 210/719 |
| 4,159,309 | 6/1979 | Faul et al. | 210/757 |
| 4,420,401 | 12/1983 | Kretas et al. | 210/719 |
| 4,909,944 | 3/1990 | Jackson et al. | 210/912 |

FOREIGN PATENT DOCUMENTS 51-43369  7/1976  Japan ................................ 210/912
63-134639  6/1988  Japan ................................ 210/719

Primary Examiner—Peter Hruskoci
Attorney, Agent, or Firm—Kurt Kelman

[57] ABSTRACT

A process for recovering copper from cupric ion containing aqueous solutions which comprises adding to the aqueous solution containing cupric ions an amount of reducing agent which corresponds from 0.1 to 10 moles of reducing agent per mole cupric ion, and heating the reaction mixture in the absence of oxygen in a closed vessel to a temperature of from 170° to 240° C., said reducing agent being one or more members of the group consisting of:

(a) organic aldehydes RCHO (R=H, $C_1$ to $C_5$ alkyl)
(b) carboxylic acids R COOH (R=H, linear or branched $C_1$ to $C_5$ alkyl)
(c) hydroxycarboxylic acids $R_1$COOH ($R_1$=HO$(CH_2)_n$, $CH_3$CH(OH)—, $CH_3(CH_2)_n$, CH(OH)— with n=1 to 3)
(d) dicarboxylic acids $R_2$COOH ($R_2$=HOOC$(CH_2)_n$ with n=1 to 3)
(e) amino acids $R_3$ COOH ($R_3$=$CH_3(CH_m$CH($NH_2$)—$(CH_3)_2$(CH)$_m$CH($NH_2$)— with m=1 to 3, $CH_3$.CH(OH)($NH_2$), HOO C.CH($NH_2$).$(CH_2)_p$— with p=1 to 3,2-pyrrolidinyl, imidazolyl—CH($NH_2$)—, indolyl—$CH_2$—(CH($NH_2$)—and alkali or ammonium salts thereof.
(f) alcohols having more than 2 carbon atoms and up to 6 hydroxy groups.

3 Claims, No Drawings

PROCESS FOR RECOVERING COPPER FROM COPPER ION CONTAINING AQUEOUS SOLUTIONS

The invention relates to a process for recovering copper from copper ion containing aqueous solutions. In particular the invention relates to the recovery of metallic copper from aqueous waste solutions such as selectroplating baths, scouring waste solutions and other chemical wastes containing cupric ions, such as cupric sulfate, besides water.

It has been known to recover copper from copper sulfate solutions by reducing gases, such as hydrogen and carbon monoxide at increased pressure and temperature (Ipatiew, Chemische Berichte Vol. 59, page 1412 (1926) ff. and Vol. 60, page 1952 ff. (1927). In order to obtain reasonable reduction rates, however, the temperature and pressure conditions involved are a hazard and generally don't allow technical scale recycling of cupric ions containing chemical wastes.

It has been found that the use of certain organic aldehydes, carboxylic acids and derivates thereof allow a safe recovery of copper from said waste solutions under moderate temperature and pressure conditions.

Object of the invention is therefore to provide a process that allows simple and efficient recovery of copper from aqueous chemical waste solutions containing cupric ions. Another object of the invention is to provide an economical process for recovering copper from cupric ion containing wastes by using either cheap organic acids or even such acids containing wastes.

The process of the invention for recovering copper from copper ion containing aqueous solutions comprises adding to the aqueous solution containing cupric ions an amount of reducing agent which corresponds from 0.1 to 10 moles of reducing agent per mole cupric ion, and heating the reaction mixture in the absence of oxygen in a closed vessel to a temperature of from 170° to 240° C., said reducing agent being one or one or more members of the group consisting of:

(a) organic aldehydes RCHO (R=H, $C_1$ to $C_5$ alkyl)

(b) carboxylic acids R COOH (R=H, linear or branched $C_1$ to $C_5$ alkyl)

(c) hydroxycarboxylic acids $R_1$COOH ($R_1$=HO $(CH_2)_n$, $CH_3CH(OH)$—, $CH_3(CH_2)_n$ CH(OH)— with n=1 to 3)

(d) dicarboxylic acids $R_2$COOH ($R_2$=HOOC$(CH_2)_n$ with n=1 to 3)

(e) amino acids $R_3$ COOH ($R_3$=$CH_3(CH)_m$CH(NH$_2$)—$(CH_3)_2$(CH)$_m$CH(NH$_2$)— with m=1 to 3, $CH_3.CH(OH)$ (NH$_2$), HOO C.CH(NH$_2$).(CH$_p$— with p=1 to 3,2-pyrrolidinyl, imidazolyl—CH(NH$_2$)—, indolyl—CH$_2$—CH(NH$_2$)— and alkali or ammonium salts thereof (f) alcohols having more than 2 carbon atoms and up to 6 hydroxy groups.

Preferred reducing agents are the simpler and cheaper ones like formaldehyde, acetaldehyde, formic acid, acetic acid, propionic acid, glycolic acid, lactic acid, glycine, alanine and serine. Higher yields, however, are obtained with reducing agents having a bigger molecule, such as isobutyric acid, α-hydroxy isovaleric acid, α-hydroxy isocaproic acid, valine, threonine, glutamic acid, proline. Higher alcohols such as glycerol or glucose are also suited with markedly reduced reactions times.

The process is preferably carried out batchwise using an autoclave or other closed vessel suitable for withstanding an autogenic pressure in the range of from 10 to 50 bars.

The heating is carried out either directly e.g. by inductive heating or by external heating in the usual manner using an oil bath, electric heating coils, gas, oil or other firing material.

The duration of heating differs considerably and depends from the reducing agent used and the molar ratio of reducing agent: cupric ions. Usual duration is from 2 to 80 hours, a time of 5 to 24 hours being normally sufficient.

The reaction that takes place is not clearly understood and may differ with the reducing agent used. It appears, however, that generally a reaction such as

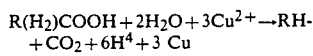

$$R(H_2)COOH + 2H_2O + 3Cu^{2+} \rightarrow RH\text{-} + CO_2 + 6H^4 + 3\ Cu$$

is followed. In most cases the reducing agent is not fully degraded in particular if a molar excess is used. It appears, however, that the reducing agent should be able to contribute at least 2 hydrogen ions to the reaction.

It has been found that in a most economical way copper ions containing aqueous industrial wastes may be treated with wastes containing one or more of the reducing agents listed above.

The metallic copper recovered from the reaction mixture by filtration or centrifugation has normally an amorphous to crystalline structure, depending from the reducing agent used. For instance when using amino acids the structure of the copper is highly crystalline whereas aldehydes form more amorphous products.

The invention is illustrated by the following Examples.

An amount of CuSO$_4$ as given in Table I was filled into a glass ampoule of 200 mm length, a diameter of 17 mm and a wall thickness of 2 mm and 5 ml of water added. Further the amount of reducing agent given in Table I was also filled into the ampoule together with 5 ml of water. The ampoule was closed by melting the glass opening and put into a steel tube and placed into a furnace which was heated to 200° C. After the time given in Table I the ampoule was frozen with liquid nitrogen and opened by touching with a hot glass rod. After dewing the samples were analyzed. Copper was measured by electrogravimetry by dissolving the crystalline copper in nitric acid, filtering, washing the filter with distilled water and adding 120 mg of urea. The solution was filled up with distilled water to 100 ml and electrolyzed at 40° C. and 2.2 V. The exactness of the method was verified by several blind analysis using distinct amounts of CuSO$_4$.

The carboxylic acid residual amounts were analyzed according to the Ulsch-method (Jander, Maβanalyse, Walter de Gruyter edition, Berlin 1973) by using water steam distillation. To the filtrate of the reaction mixture was added of a 98% phosphoric acid. The distillate was titrated with 0.1 n NaOH using phenolphthalein. as indicator.

The results obtained are given in the following Table I:

TABLE I

| Example | Reducing agent | Amount m mole | Amount $Cu^2$ m mole | Molar yield of Cu, % | Reaction time at 200° C., hrs |
|---|---|---|---|---|---|
| 1 | HCHO | 10 | 5 | 92 | 18 |
| 2 | $CH_3CHO$ | 5 | 5 | 72.5 | 18 |
| 3 | $C_2H_5CHO$ | 1 | 2 | 74 | 78 |
| 4 | $C_3H_7CHO$ | 0.7 | 3.4 | 62 | 48 |
| 5 | $C_4H_9CHO$ | 1.7 | 3.4 | 82 | 48 |
| 6 | HCOOH | 3.75 | 5 | 85 | 18 |
| 7 | HCOO—Na | 5 | 5 | 99 | 18 |
| 8 | $CH_3$ COONa | 4.5 | 5 | 64 | 18 |
| 9 | $C_2H_5$ COOH | 2.5 | 5 | 80 | 48 |
| 10 | i-$C_3H_7$ COOH | 5 | 5 | 82 | 80 |
| 11 | n-$C_3H_7$ COOH | 5 | 5 | 64 | 80 |
| 12 | i-$C_4H_9$ COOH | 5 | 5 | 80 | 80 |
| 13 | h-$C_4H_9$ COOH | 5 | 5 | 50 | 80 |
| 14 | HOOC $C_2H_4$ COOH | 3 | 3 | 52 | 80 |
| 15 | Glycolic acid | 1.7 | 5 | 82 | 48 |
| 16 | lactic acid, $NH_4$-salt | 1 | 3 | 60 | 18 |
| 17 | α-hydroxybutyric acid | 1.7 | 5 | 45 | 48 |
| 18 | α-hydroxyisovaleric acid | 1.7 | 5 | 87 | 48 |
| 19 | α-hydroxyisocaproic acid | 1.7 | 5 | 82 | 48 |
| 20 | Glycine | 1.7 | 5 | 78 | 48 |
| 21 | " | 5 | 5 | 90 | 48 |
| 22 | Alanine | 5 | 5 | 97 | 80 |
| 23 | leucine | 1.7 | 5 | 72 | 80 |
| 24 | Valine | 1.7 | 5 | 93 | 80 |
| 25 | Serine | 1.7 | 5 | 64 | 80 |
| 26 | Threonine | 1.7 | 5 | 95 | 80 |
| 27 | aspartic acid | 1.7 | 5 | 66 | 80 |
| 28 | Glutamic acid | 1.7 | 5 | 92 | 80 |
| 29 | Proline | 1.7 | 5 | 96 | 80 |
| 30 | Glycerol | 1 | 2 | 18 | 8 |
| 31 | Glucose | 0.01 | 2 | 25 | 10 |

We claim:

1. A process for recovering copper from cupric ion containing aqueous solutions which comprises
   adding to the aqueous solution containing cupric ions an amount of reducing agent which corresponds from 0.1 to 10 moles of reducing agent per mole of cupric ion to produce a reaction mixture;
   heating the reaction mixture in the absence of oxygen in a closed vessel to a temperature of from 170° to 240° C. at a pressure of from 10 to 50 bars, for a time from 2 to 80 hours to precipitate metallic copper; and
   separating the precipitated metallic copper from the aqueous solution to recover the copper; and
   wherein the reducing agent is selected from the group consisting of isobutyric acid, α-hydroxy isovaleric acid, α-hydroxy isocaproic acid, valine, threonine, glutamic acid, and proline.

2. Process as claimed in claim 1 wherein the reaction is carried out batchwise in a closed vessel suitable for withstanding an autogenic pressure in the range of from 10 to 50 bars which is heated directly or externally.

3. A process as claimed in claim 1 wherein the cupric ion containing solution is an industrial waste of an electrolytic, scouring or leaching process.

* * * * *